United States Patent Office 3,424,475
Patented Jan. 28, 1969

3,424,475
LIFT TRUCK SUSPENSION SYSTEM
Christian D. Gibson, Greene, N.Y., assignor to The Raymond Corporation, Greene, N.Y., a corporation of New York
Continuation of application Ser. No. 392,529, Sept. 27, 1964. This application Nov. 15, 1967, Ser. No. 683,381
U.S. Cl. 280—124                                    8 Claims
Int. Cl. B60g 11/14; B60k 17/30

ABSTRACT OF THE DISCLOSURE

A compact articulating lift-truck idler wheel arrangement of reduced height having a spreader to communicate wheel forces to compression springs mounted adjacent rather than above the idler wheel king pin, the axis of which may or may not be offset from the idler wheel floor contact point, with three separate and independent means for adjusting the basic height of the idler wheel assembly relative to the truck frame, the spring rate of the compression springs, and the limit of travel of the articulating idler wheel relative to the main frame of the truck.

---

This application is a continuation of my prior copending application Ser. No. 392,529 filed Aug. 27, 1964 now U.S. Patent No. 3,392,297.

The present invention relates to an improved material-handling truck, and more particularly, to an improved wheel suspension arrangement for use in lift trucks and the like. My prior Patent No. 2,564,002 granted Aug. 14, 1951, shows a four-wheel lift truck having its front end supported by a pair of non-steerable load bearing front wheels and its rear end supported by one off-center powered drive wheel and a mating off-center non-powered swivel caster wheel. Four-wheeled vehicles having a single driving wheel are limited in tractive ability unless the unpowered wheel mated with the drive wheed is designed to yield in some fashion, as by articulation or spring action. If the unpowered wheel is on a higher elevation on the floor than the drive wheel, the unpowered wheel must be arranged to yield vertically to insure adequate contact of the drive wheel with the floor. Spring suspension of at least one of the wheels also considerably improves the riding qualities of the truck, making it much more comfortable for the truck operator. It is highly desirable that the spring force associated with such yielding, and the maximum amount of such yielding be readily adjustable. Furthermore, it is desirable that the normal relative height or vertical relationship of the drive wheel to the mating unpowered wheel be capable of ready adjustment to compensate for uneven tire wear or to adjust drive wheel traction. Thus it is a primary object of the present invention to provide an improved lift truck wheel suspension system in which the height of a vertically-yielding unpowered vehicle wheel relative to that of a powered drive wheel may be readily adjusted. It is another object of the present invention to provide an improved lift truck wheel suspension in which the spring rate of such a spring-suspended wheel may be readily adjusted.

The invention finds particular utility in so-called "narrow-aisle" lift tucks which are made as compact as possible to enable sharp turns within narrow warehouse aisles. The invention is useful both in connection with non-castered idler wheels connected to be steered by steering linkages and in connection with self-steering swivel caster idler wheels in which the wheel kingpin is offset from the wheel axle and floor contact point. It is highly desirable in either type of narrow-aisle truck that the vertical height of the idler wheel assembly be minimized, generally to allow the space required for other elements of the truck and in order that it obstruct as little as possible the operator platform provided nearby. Thus it is an equally important object of the present invention to provide an idler wheel spring suspension of the type mentioned which occupies a minimum vertical height and thus is suitable for use in narrow-aisle lift trucks.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 1:
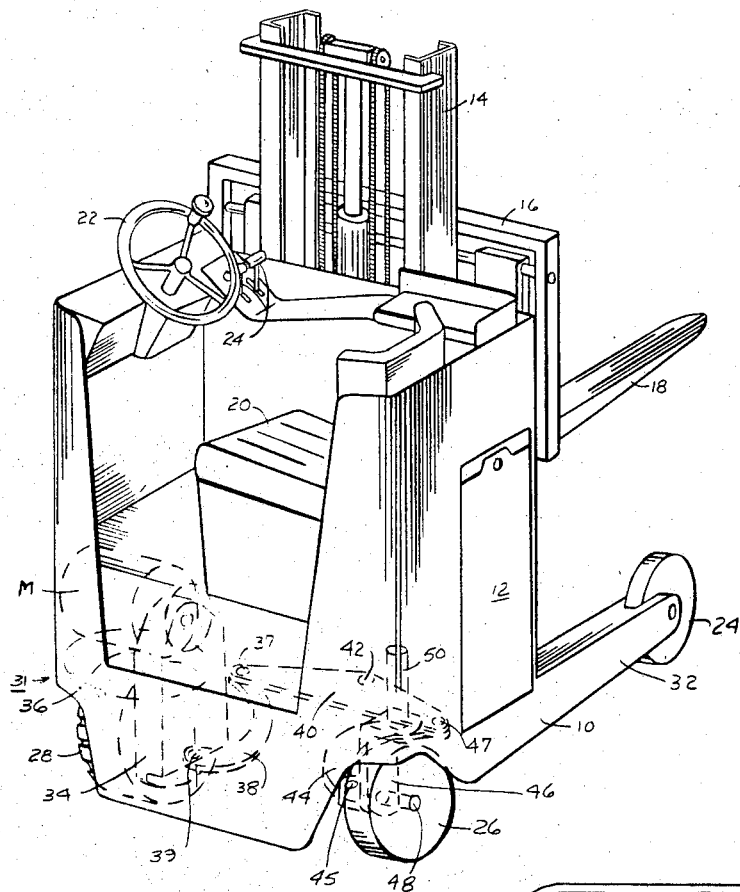
FIG. 1 is a perspective view of one form of material-handling truck adapted to utilize the idler wheel suspension of the present invention.

The truck of FIG. 1 comprises a main frame 10 supported on four wheels, only three of which are visible in FIG. 1. The main frame 10 carries a battery compartment 12 which extends across the truck and in which compartment electric storage batteries to power the truck are situated, a mast 14 up and down which a load carriage 16 is moved, and load-engaging means shown as comprising one fork 18 of a conventional pair of load forks are carried on carriage 16. Also mounted on main frame 10 are a driver's seat 20, a steering wheel 22 and a plurality of further controls 24, 24 which are manipulated by the driver.

While the truck shown in FIG. 1 is provided with seat 20 to accommodate a seated driver, it will be apparent that the invention is applicable as well to trucks having platforms to accommodate standing operators, and in fact, the invention advantageously allows such a platform to be located at a low level, a very short distance above the floor upon which the truck operates.

The truck is supported by four wheels, 24, 26, 28 and 30, the latter not being visible in FIG. 1. Front wheel 24 is shown journalled at the front end of forwardly-extending arm 32. Front wheel 30 (not shown in FIG. 1) is similarly journalled at the front end of a similar forwardly-extending arm (not shown) which extends parallel to arm 32. The truck is driven by dirigible wheel 28, which is driven by motor M through gearing in a manner to be described in detail below in connection with FIG. 3. The drive assembly 31 comprising drive wheel 28, gearing 34 and drive motor M preferably is mounted in bearing means (shown diagrammatically at 36) of a type shown in my Patent No. 3,332,728, to rotate about a vertical axis. Drive assembly 31 is pivotally connected at 39 to one end of steering drag-link 38, and the other end of drag-link 38 pivotally connects at 37 to one end of steering rocker beam 40. Rocker beam 40 is pivotally attached at its center by means of bolt 41 to the truck main frame 10, as shown in detail in FIG. 3. The other end of rocker beam 40 is pivotally connected at 47 to one end of a further drag link 44, and the other end of drag link 44 is pivotally connected at 45 to wheel support member 46. An axle 48 extending from wheel support member 46 carries idler wheel 26. Wheel support member 46 is carried on a vertically extending shaft 50, which is rotatably and slidably mounted in main frame 10, in a manner better seen in FIGS. 3 and 4.

Figure 2:
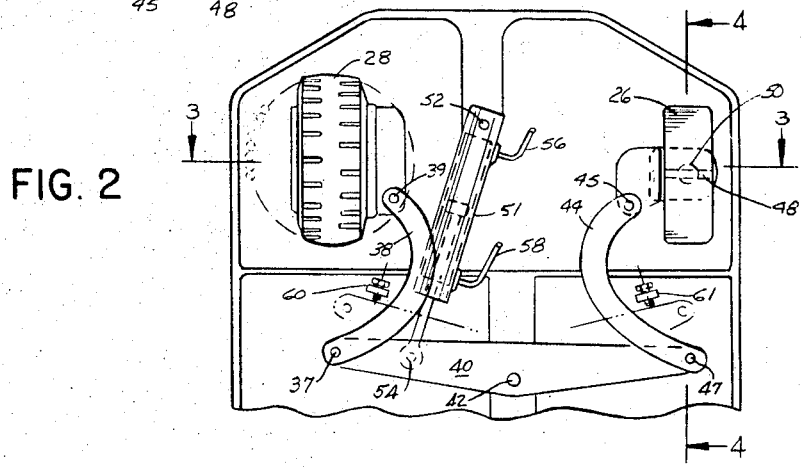
FIG. 2 is a view of a portion of the truck of FIG. 1 looking upwardly from underneath the truck showing the general arrangement of the powered drive wheel and the articulated idler wheel.

As best shown in FIG. 2, a double-acting piston-cylinder assembly 51 is pivotally connected at 52 and 54 to act between the truck main frame 10 and pivoting steering beam 40, and hydraulic pressure connections are made to the piston-cylinder assembly 51 via flexible hoses 56 and 58, which are connected to conventional hydraulic power-assist control apparatus (not shown) controlled by operation of steering wheel 22. The translation of the piston within the cylinder will be seen to pivot steering rocker beam 40 about its pivot point 42, thereby turning both powered drive wheel 28 and idler wheel 26 through drag links 38 and 44, respectively.

The ends of rocker beam 40 are shown in dashed lines at opposite limits of travel in FIGURE 2. A pair of adjustable stop means 60, 61 fixedly mounted on main frame 10 (see FIGURE 4) determine the maximum limits of rotation of rocker beam 40 about its pivot 42. As shown in FIG. 2 the axis of vertical shaft 50, upon which idler wheel support member 46 is carried, is arranged to perpendicularly intersect axle 48 upon which idler wheel 26 is journalled, as is better shown in FIGS. 3 and 4. Thus idler wheel 26 is not castered, and the idler wheel steering axis of shaft 50 passes through the idler wheel center and the idler wheel floor contact point.

Figures 3, 4:
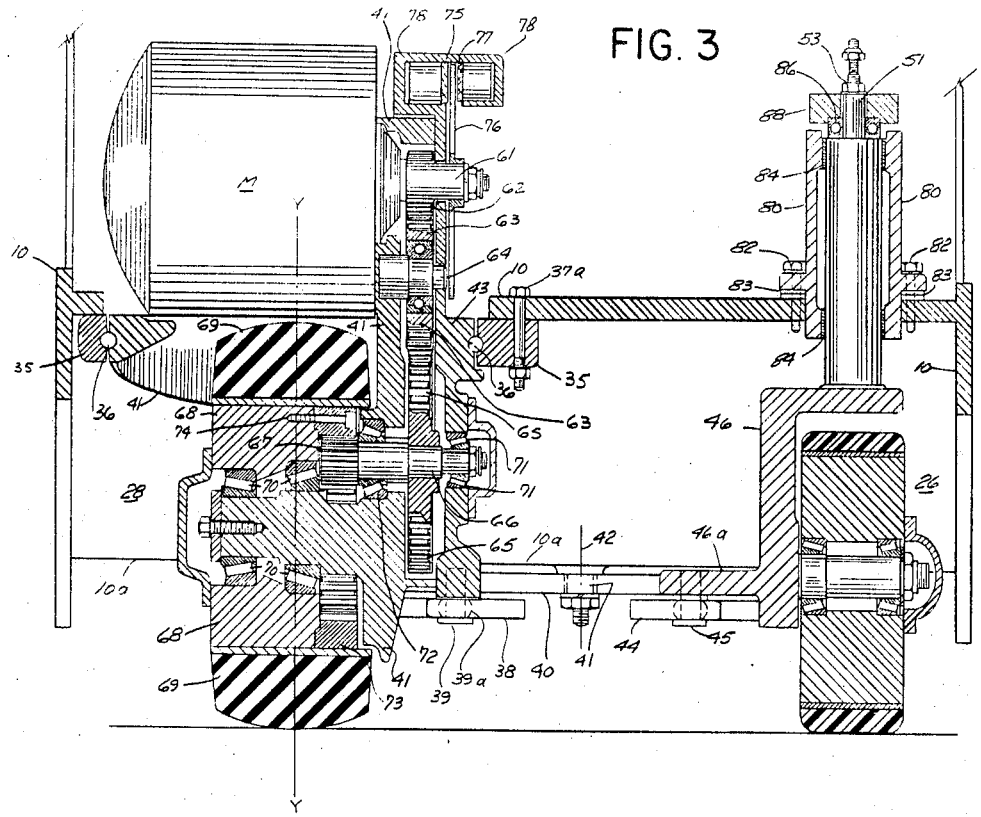
FIG. 3 is a cross-section view taken along line 3—3 of FIG. 2.
FIG. 4 is a cross-section view taken along line 4—4 of FIG. 2.

The mounting of drive assembly 31 to allow rotation about a vertical axis will be apparent from FIG. 3. A circular mounting ring 35 surounding assembly 31 is bolted at several places to main frame 10, a single bolt 34a being shown in FIG. 3. Mounting ring 35 serves as the outer race of ball bearing assembly 36, in which the entire drive assembly is rotatably mounted. The drive assembly includes drive unit main frame casting 41 and gear housing 43, which are joined together to provide a circular periphery having a groove which serves as the inner race of the bearing member. Motor M is fixedly mounted (as by means of bolts, not shown) to main drive unit casting 41. The output shaft 61 of motor M carries pinion 62. Pinion 62 meshes with pinion 63, which is journalled on a ball bearing on stub shaft 64, which is fixedly carried in main drive unit casting 41. Pinion 63 meshes with gear 65 mounted on shaft 66, which is journalled in main casting 41 by means of roller bearing 72 and in gear housing 43 by means of roller bearing 71. Pinion end 67 of shaft 66 meshes with an internally-toothed ring gear 73, which is bolted to felly 68 of drive wheel 28 by means such as bolt 74. Tire 69 is carried on felly 68. Further ball bearing means shown at 70 rotatably support wheel felly 68 on main drive unit casting 41. Thus it will be seen that motor M drives wheel 28 through a reduction gear train including gears 62, 63, 64, 65, 67 and 73. Also mounted on shaft 61 of motor M is disc 76 of a disc brake assembly. The brake housing 78 portion of gear housing 43 carries pads 75 and 77 which controllably engage disc 76 to brake the drive unit. The disc brake arrangement preferably comprises that shown in U. S. Patent No. 3,280,933 issued to Robert E. Jones.

The central axis Y—Y of bearing unit 36 passes through the center of felly 68 and tire 69 as shown, and hence the entire drive unit may be rotatably positioned about the Y—Y axis to steer the truck. As shown in FIG. 3, one end of drag link 38 is pivotally attached to gear housing 43 of the drive wheel assembly by means of pin 39 through ball-joint or self-aligning bearing 39a. The connection of the other end of drag link 38 by a similar ball-socket connection to steering rocker beam 40 is not shown in FIG. 3, being hidden behind wheel 28. Rocker beam 40 is pivotally mounted to the truck main frame 10, by means of stub shaft 41a which is integral with main frame 10, to pivot about axis 42. Drag link 44 is connected with a similar ball-socket joint 45 to a plate portion 46a of idler wheel support casting 46, and the other end of drag link 44, which is hidden behind idler wheel 26 in FIG. 3, is similarly connected to rocker beam 40 at point 47, as shown in FIG. 4. Ball-joint or self-aligning bearings are used to tie drag link 44 to rocker beam 40 and the idler wheel assembly so as to allow vertical travel of the idler wheel relative to main frame 10.

Unless a four-wheeled vehicle having a single driving wheel has its mating caster or idler wheel designed to yield, as by articulation or spring action, the vehicle tractive ability is seriously limited when the vehicle is used other than on very smooth floors. If the idler wheel is on a high spot on the floor it is necessary that the idler wheel yield vertically upwardly to insure adequate functional contact between the drive wheel and the floor. Cylindrical stem or shaft 50 is rigidly attached to idler wheel mounting member 80, which is rigidly attached to the truck main frame 10 by means shown as comprising bolts 82, 82. Mounting member 80 is provided with upper and lower guide bushings 84, 84 which allow vertical stem 50 both to translate and to rotate. The upper end 51 of stem 50 is provided with a first reduced diameter portion to accommodate thrust bearing 86 and a second portion of reduced diameter which is threaded to accommodate nut 53. The vertical force on stem 50 is applied through thrust bearing 86 to spreader bar 88, which communicates the vertical load from thrust bearing 86 to a pair of spring-biased rods 90, 90 (see FIG. 4) which are urged downwardly by compression springs 92, 92. With little or no vertical force on the idler wheel, springs 92 will urge spreader bar 88 downwardly so that the lower face of spreader bar 88 will lie against the upper face of mounting member 80, and in such a condition idler wheel 26 will be in its lowermost condition. Nut 53 holds spreader bar 88 on the upper end of shaft 50 to establish a definite vertical relationship between bar 88 and shaft 50, but shaft 50 is able to rotate about its axis. Rods 90, 90 pass slidingly through member 80 and spreader bar 88, and the upper ends of rods 90 are threaded to accommodate adjustment nuts 91, 91.

When a greater vertical load is applied to idler wheel 26, the load is applied via stem 50, thrust bearing 86, spreader bar 88 and rods 90, 90 to compress springs 92, 92, with spreader bar 88 being lifted upwardly from member 80. The amount which the springs are compressed and the distance which the spreader bar is moved upwardly will be seen to be dependent upon the magnitude of the vertical force applied to idler wheel 26.

In order that the vehicle be readily adaptable to widely-varying weight and load conditions, it is very important that the idler wheel spring yielding force be readily adjustable. Such adjustment is also highly desirable in order to adjust drive wheel traction. In accordance with the invention, the yielding force may be readily adjusted in a simple and fool-proof manner merely by loosening or tightening nuts 91, 91 on the upper threaded ends of spring rods 90, 90, thereby determining the vertical force necessary to raise spreader bar 88 upwardly from member 80.

As previously mentioned it is extremely important in narrow-aisle truck applications that the idler wheel assembly require a minimum overall height and to this end the compression spring means are mounted at substantially the same level as idler wheel stem 50 rather than above stem 50 and spreader bar 88 and rods 90 communicate the vertical force on stem 50 to springs 92. Thus the springs need not be mounted appreciably above wheel stem 50. It will be apparent that more than two springs may be used if desired.

For different material-handling applications it is highly desirable that the maximum permissible amount of vertical yielding of the idler wheel be readily adjustable. For example, a truck planned for very high stacking in a warehouse having a relatively smooth floor should have little or no vertical movement, while a truck with a low lifting range intended to travel over rough dock boards should have maximum vertical travel of the idler wheel. In order that a truck may be quickly adapted for either type of application and readily changed from one to the other, ready adjustment of maximum vertical travel of the idler wheel is required. In accordance with the invention, a pair of studs 55, 55 which are threaded into member 80 and pass through spreader bar 88 are provided with adjustment nuts 56, 56. It will be seen that adjustment of nuts 56, 56 determines the maximum distance which spreader bar 18 may be raised upwardly from fixed member 80, and hence the maximum amount which idler wheel 26 may be raised. It should be noted that the limit distance adjustment effected by adjustment of nuts 56, 56 and the spring-force adjustment effected by adjustment of nuts 91, 91 are separate and independent, so that adjustment of one characteristic does not affect the adjustment of the other.

As best seen in FIG. 3, idler wheel mounting member 80 is bolted to main frame 10 by bolts 82, through flange portions at the base of member 80. In order to adjust the basic height relationship between the entire idler wheel assembly and the truck main frame (and drive wheel), shims 83, 83 are provided between member 80 and main frame 10. It is frequently necessary or desirable to be able to adjust the nominal level of the idler wheel in order to keep the idler wheel contact even with the contact point of the drive wheel, which is much more subject to wear, and in addition, such adjustment of the idler wheel assembly may be used to transfer load from the idler wheel to the drive wheel, or from the drive wheel to the idler wheel. Prior art caster wheels having spring suspension were required to adjust the relative height between the two wheels by raising or lowering the entire drive wheel assembly with respect to the truck main frame. In accordance with the present invention all of the relative height adjustment is accomplished by adjustment of the height of the idler wheel assembly, with the advantage that the larger, heavier and more complicated drive wheel assembly may have a fixed vertical mounting with respect to the truck main frame.

Figure 5:
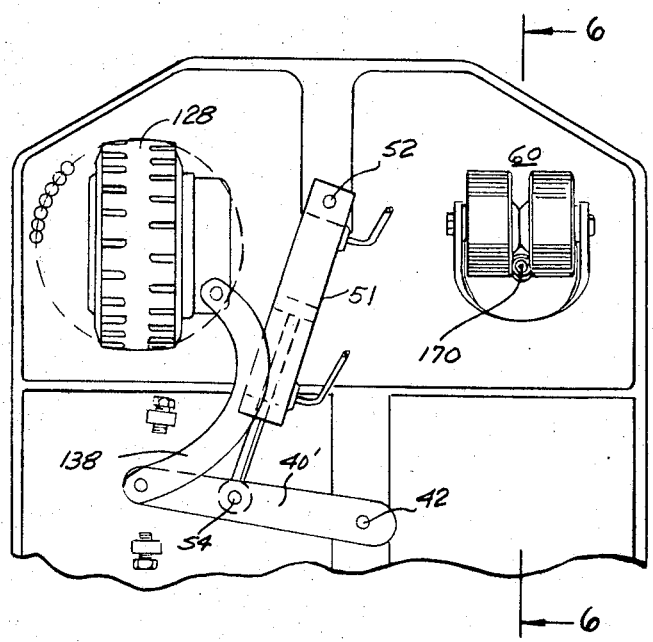
FIG. 5 is a view looking upwardly from beneath a truck which incorporates a modified form of idler wheel assembly.
Figure 6:
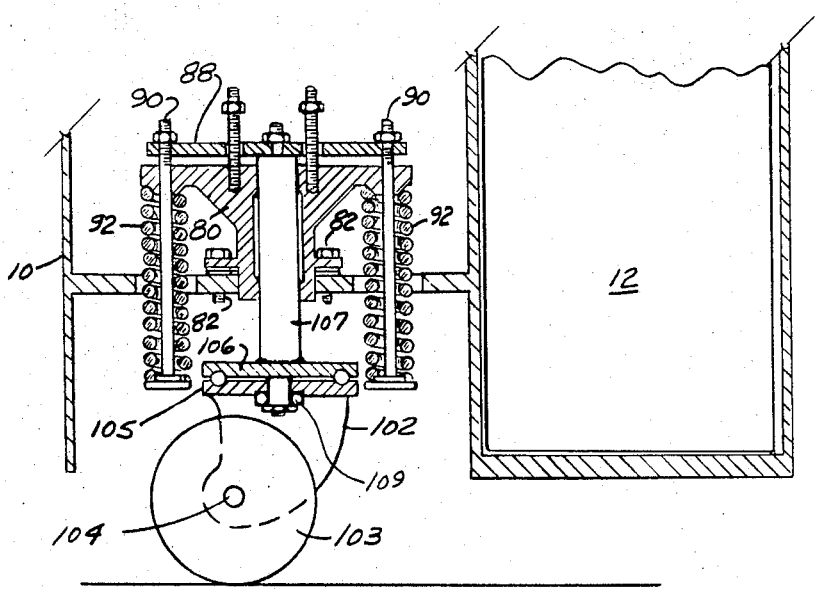
FIG. 6 is a side view, taken at line 12—12 in FIG. 5, of the modified idler wheel assembly.

While the preferred embodiment of the invention has been described above in connection with a non-castered idler wheel, the principal features of the invention may be applied as well to trucks utilizing swivel casters. In certain vehicles, such as the type shown in my prior Patent 2,925,887, the use of swivel casters is highly advantageous. In such a vehicle the swivel caster mounting may simply and advantageously utilize the spring suspension arrangement as illustrated in FIGS. 5 and 6 wherein caster yoke member 102 carried caster wheel 103 journalled on axle 104. Upper plate portion 105 of yoke member 102 and base plate portion 106 of shaft member 107 form opposite races of a bearing, thereby allowing yoke 102 and wheel 103 to swivel about the axis of reciprocating but non-rotating shaft 107. The vertical force on the caster wheel is applied via reciprocable shaft 107, which corresponds in principle to shaft 50 of FIG. 4, except that shaft 107 is merely translatable, and not rotatable, in the device of FIG. 6. Shaft 107 is preferably pinned or keyed to spreader bar 88 to prevent relative rotation between these parts. Bearing 109 on the lower end of shaft 107 facilitates rotation of yoke 102 and wheel 103 about the axis of shaft 107. The remainder of the suspension system of FIGS. 5 and 6 corresponds to similarly numbered parts of the system of FIG. 4 and need not be further described in detail.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A vehicle having a spring suspension, comprising, in combination: a vehicle base frame; first means for mounting a plurality of wheels at fixed heights relative to said frame to support said frame above a floor surface; a single idler wheel means; and second mounting means for attaching said idler wheel means to said base frame to allow both rotation and translation of said idler wheel means with respect to said base frame, said second mounting means including a first member having axle means and a vertically-extending shaft means, said idler wheel means being journalled on said axle means, bearing means rigidly affixed to said base frame, said bearing means having a vertical bore, said shaft means being journalled in said vertical bore with an end of said shaft means protruding upwardly beyond said bore, a bar attached to said end of said shaft means, rod means attached to and extending downwardly from said bar, and compression spring means adapted to act between said rod means and said bearing means to yieldingly resist vertical translation of said idler wheel means, said compression spring means being located at a level below said bar and arranged to urge said shaft means and said idler wheel means downwardly.

2. A vehicle according to claim 1 in which said bar extends horizontally on opposite sides of said vertically-extending shaft means and in which said compression spring means comprises at least one spring disposed on each side of said shaft means.

3. A vehicle according to claim 1 including adjustable stop means affixed to said bearing means and adapted to positively limit upward translation of said shaft means.

4. A vehicle according to claim 1 in which said shaft means is both rotatable and translatable with respect to said bearing means.

5. A vehicle according to claim 1 in which said shaft means is translatable with respect to said bearing means and constrained against rotation with respect to said bearing means.

6. A vehicle according to claim 1 in which the axis of said vertically-extending shaft means substantially perpendicularly intersects the axis of said axle means.

7. A vehicle according to claim 1 in which said bearing means is rigidly affixed to said base frame by means of removable shim means.

8. A vehicle according to claim 1 having second rod means extending upwardly from said bearing means, and adjustable limit stop means located above said bar means and positionably adjustable along said second rod means to limit upward translation of said bar, said shaft means and said idler wheel means.

References Cited
UNITED STATES PATENTS 3,130,981   4/1964   Christenson _____ 180—52
3,042,422   7/1962   Garnett _____ 280—96.2

PHILIP GOODMAN, *Primary Examiner.*

U.S. Cl. X.R.
180—52